(12) United States Patent
Babkov et al.

(10) Patent No.: US 10,352,493 B2
(45) Date of Patent: Jul. 16, 2019

(54) INTERSECTION CONNECTION OF LOCOMOTIVE CRYOGENIC SYSTEMS AND VARIANTS

(71) Applicant: OPEN JOINT STOCK COMPANY "RUSSIAN RAILWAYS", Moscow (RU)

(72) Inventors: Yuriy Valeryevich Babkov, Moscow region (RU); Andrei Gennadievich Voronkov, Moscow region (RU); Nikolai Konstantinovich Nikolskiy, Moscow region (RU); Igor Valentinovich Sazonov, Moscow region (RU); Boris Mikhailovich Frolov, Moscow region (RU); Valeriy Alekseevich Nikonov, Moscow region (RU)

(73) Assignee: OPEN JOINT STOCK COMPANY "RUSSIAN RAILWAYS", Moscow (RU)

( * ) Notice: Subject to any disclaimer, the term of this patent is extended or adjusted under 35 U.S.C. 154(b) by 265 days.

(21) Appl. No.: 15/356,394

(22) Filed: Nov. 18, 2016

(65) Prior Publication Data
US 2017/0336015 A1    Nov. 23, 2017

(30) Foreign Application Priority Data

May 20, 2016   (RU) .............................. 2016119590

(51) Int. Cl.
| | | |
|---|---|---|
| *F16L 59/14* | (2006.01) | |
| *F16L 39/02* | (2006.01) | |
| *F16L 59/153* | (2006.01) | |
| *F16L 59/16* | (2006.01) | |
| *B61C 5/00* | (2006.01) | |
| *F16L 57/00* | (2006.01) | |

(52) U.S. Cl.
CPC .............. *F16L 59/141* (2013.01); *B61C 5/00* (2013.01); *F16L 39/02* (2013.01); *F16L 57/00* (2013.01); *F16L 59/153* (2013.01); *F16L 59/16* (2013.01)

(58) Field of Classification Search
USPC ......................................... 285/114, 115, 116
See application file for complete search history.

(56) References Cited

U.S. PATENT DOCUMENTS

| | | | |
|---|---|---|---|
| 3,595,275 A * | 7/1971 | Steans .................... | F16L 59/125 138/114 |
| 4,111,465 A * | 9/1978 | Knight ..................... | B67D 9/02 137/615 |
| 4,137,948 A * | 2/1979 | Van Heijst .............. | F16L 27/02 138/120 |

(Continued)

FOREIGN PATENT DOCUMENTS

RU         2487032 C1       2/2013

*Primary Examiner* — James M Hewitt, II
(74) *Attorney, Agent, or Firm* — Craft Chu PLLC; Andrew W. Chu

(57) ABSTRACT

The intersection connection of locomotive cryogenic systems includes a flexible double-wall corrugated pipeline having two corrugated pipes made of cold-resistant steel, which are arranged one inside the other and separated by elastic inserts. There are end adapter flanges fixed to the end walls of the locomotive adjacent sections, and an elastic bar connected to the flexible double-wall corrugated pipeline with suspensions. The intersection connection can be provided with an elastic bar aligned relative to the inner corrugated pipe with centering elastic inserts.

2 Claims, 2 Drawing Sheets

A-A

(56) References Cited

U.S. PATENT DOCUMENTS

| | | | | |
|---|---|---|---|---|
| 4,778,105 A | * | 10/1988 | Cholkeri | F04B 49/022 |
| | | | | 236/99 R |
| 4,989,903 A | * | 2/1991 | McAllister | F16L 3/01 |
| | | | | 285/114 |
| 5,566,712 A | * | 10/1996 | White | B61C 5/00 |
| | | | | 137/587 |
| 5,713,387 A | * | 2/1998 | Armenia | D06F 39/081 |
| | | | | 137/312 |

* cited by examiner

B-B

INTERSECTION CONNECTION OF LOCOMOTIVE CRYOGENIC SYSTEMS AND VARIANTS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to special-purpose couplings for transportation means, in particular to intersection connections of cryogenic pipelines in locomotives running on cryogenic fuel (gas-turbine locomotives, gas-diesel locomotives).

2. Description of Related Art Including Information Disclosed Under 37 CFR 1.97 and 37 CFR 1.98.

A flexible pipeline for cryogenic liquids is known in the art that consists of an outer corrugated casing pipe covered with wire gauze and an inner corrugated casing pipe covered with multi-layered heat-insulating material, vacuum space being created therebetween. Undulated elements are attached to the inner corrugated pipe with the use of ceramic inserts and straps, which elements fix a position of the inner corrugated pipe relative to the outer corrugated pipe, but without hampering their mutual longitudinal shift (USSR Inventor's Certificate No. 530144, IPC F16L11/12, 1976).

A drawback of this flexible pipeline is non-uniform distribution of corrugated pipe strains along the flexible pipeline length, which strains may arise due to mutual shifts of the pipeline end flanges during movements of the locomotive sections connected by this flexible pipeline as well as due to vibration actions on the flexible pipeline; such non-uniform distribution results in high local stresses in the walls of the corrugated pipes, thus reducing their service life.

An intersection connection of cryogenic systems in a gas-turbine locomotive is also known in the art, which is taken as the prototype of this invention; this connection consists of two straight flexible double-wall corrugated pipelines made of cold-resistant steel and arranged at an angle of 85-95 degrees to each other. The respective ends of the corrugated pipelines are connected to cryogenic pipelines rigidly fixed to the end walls of the locomotive sections, and their other ends are connected to supporting arms provided with gas passages and connected to the respective ends of a rigid arched pipeline, torsion bars are connected to the supporting arms by their respective ends, and the other ends of these torsion bars are rigidly fixed to the end walls of the locomotive adjacent sections. Vacuum is created in the inter-pipe space of the double-wall pipelines. (Patent RU 2487032 C1, IPC B61G 5/06, B61C 17/02, 2013).

A drawback of this intersection connection of cryogenic systems is that its reliability and service life are reduced due to multiple connections in the pipeline, use of said rigid arched pipeline and strains in flexible double-wall corrugated pipelines arising during movement of the locomotive.

BRIEF SUMMARY OF THE INVENTION

The technical effect of the proposed invention is increased reliability and service life of the intersection connection used for locomotive cryogenic systems.

According to the first embodiment of the invention, the above technical effect is achieved by an intersection connection of locomotive cryogenic systems, comprising a flexible double-wall corrugated pipeline consisting of two corrugated pipes made of cold-resistant steel, which are arranged one inside the other and separated by elastic inserts, and provided with end adapter flanges fixed to the end walls of the locomotive adjacent sections, the intersection connection being provided with an elastic bar connected to the flexible double-wall corrugated pipeline by suspensions, the elastic bar and the flexible double-wall corrugated pipeline being made in the form of spatial helices, and the ends of the elastic bar being fixed in the adapter flanges.

According to the second embodiment of the invention, the above technical effect is achieved by an intersection connection of locomotive cryogenic systems, comprising a flexible double-wall corrugated pipeline consisting of two corrugated pipes made of cold-resistant steel, which are arranged one inside the other, separated by elastic inserts and provided with end adapter flanges fixed to the end walls of the locomotive adjacent sections, the intersection connection being provided with an elastic bar arranged in the inner cavity of the inner corrugated pipe of the flexible double-wall corrugated pipeline and aligned relative to the inner corrugated pipe of the pipeline with the use of elastic inserts, the flexible double-wall corrugated pipeline and the elastic bar being made in the form of spatial helices, and the ends of the elastic bar being fixed in the adapter flanges.

DETAILED DESCRIPTION OF THE INVENTION

Figure 1:
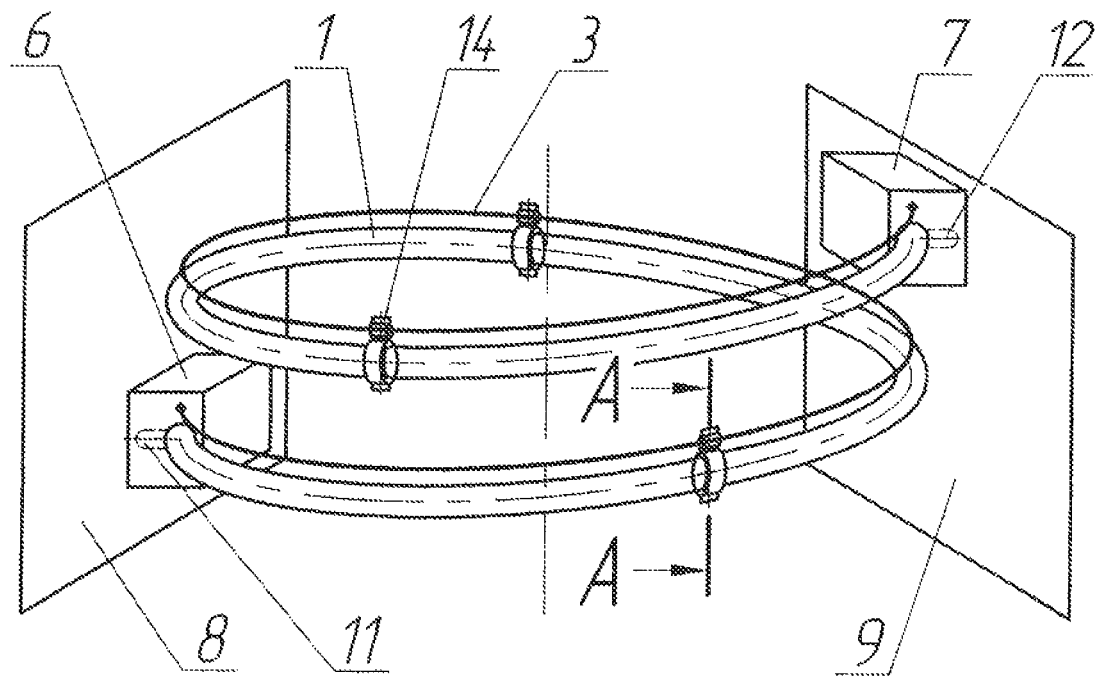
FIG. 1 shows a schematic view of the intersection connection of locomotive cryogenic systems (according to the first embodiment).
Figure 2:
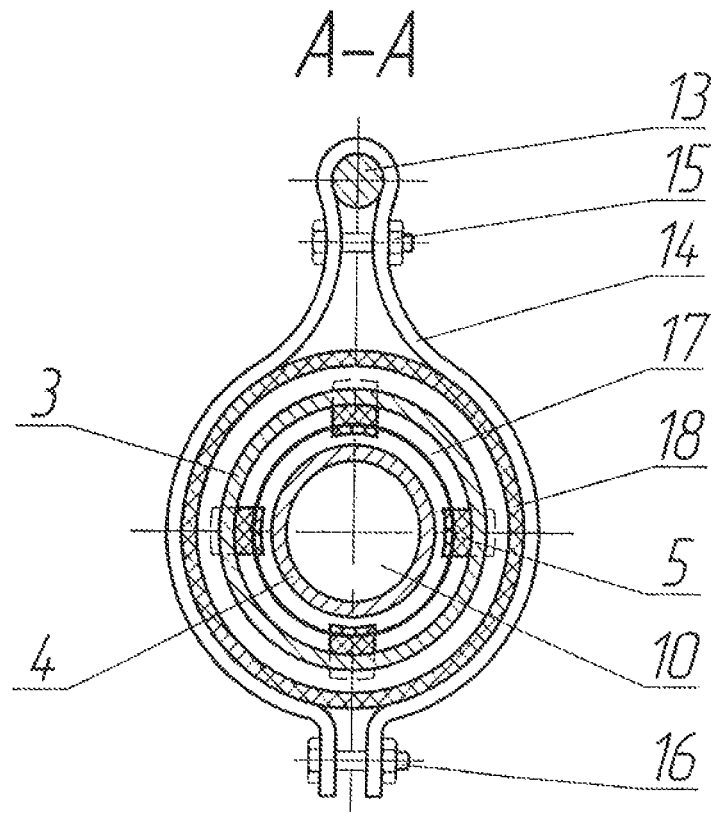
FIG. 2 shows a sectional view along line A-A of FIG. 1.

The intersection connection of locomotive cryogenic systems according to the first embodiment of the invention (FIGS. 1, 2) comprises a flexible double-wall corrugated pipeline 1 consisting of two corrugated pipes, an outer pipe 3 and an inner pipe 4, which are made of cold-resistant steel, arranged one inside the other, separated by elastic inserts 5 and provided with end adapter flanges 6 and 7. The end adapter flanges 6 and 7 are fixed to the end walls 8 and 9 of the locomotive adjacent sections. The adapter flanges 6 and 7, which are connected to the ends of the flexible double-wall corrugated pipeline 1, connect the cryogenic gas cavity 10 (FIG. 2) of the flexible double-wall corrugated pipeline 1 with the cryogenic gas passages 11 and 12 in the end walls 8 and 9 of the locomotive adjacent sections.

The intersection connection is provided with an elastic bar 13 connected to the flexible double-wall corrugated pipeline 1 by suspensions 14, the elastic bar 13 and the flexible double-wall corrugated pipeline 1 being made in the form of spatial helices, and the ends of the elastic bar 13 being fixed in the adapter flanges 6 and 7. The suspensions 14 (FIG. 2) cover regions of the elastic bar 13 and regions of the flexible double-wall corrugated pipeline 1 closest thereto and are fastened by bolt connections 15 and 16.

An annular passage 17 between the inner corrugated pipe 4 and the outer corrugated pipe 3 is vacuumized or filled with a heat-insulating material or an inert gas. The elastic inserts 5 are made of a low-conductivity material. The outer surface of the flexible double-wall corrugated pipeline 1 is provided with a heat-insulating layer 18.

Figure 3:
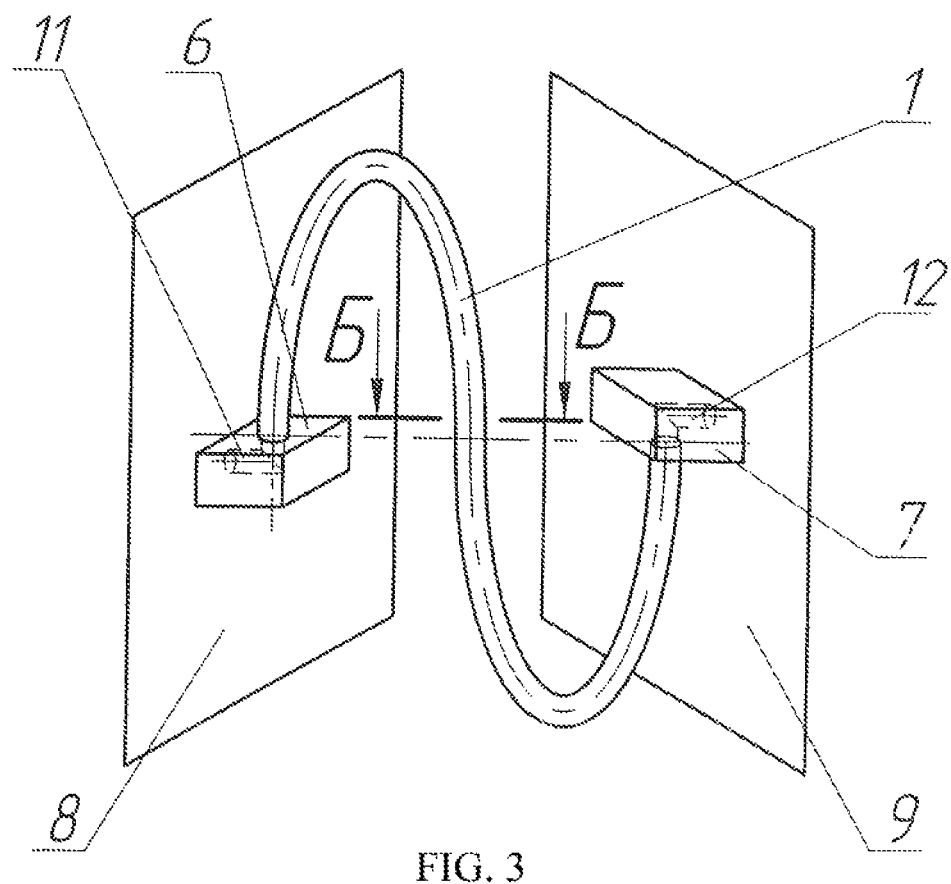
FIG. 3 shows another schematic view of the intersection connection of locomotive cryogenic systems (according to the second embodiment).
Figure 4:
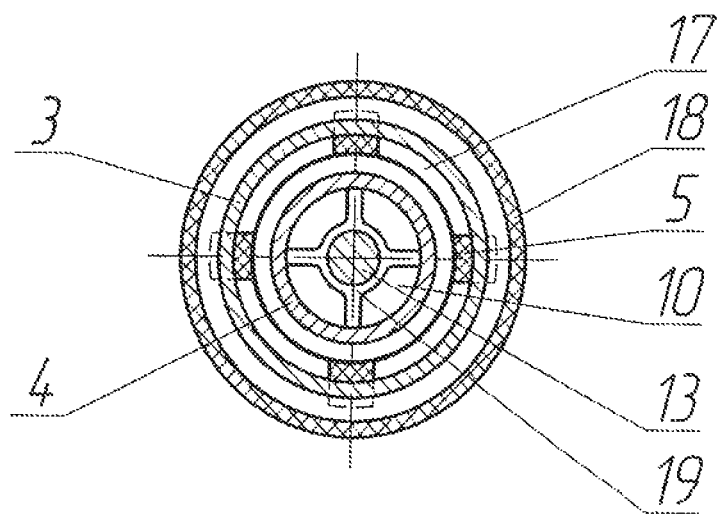
FIG. 4 shows a sectional view along line B-B of FIG. 3.

The intersection connection of locomotive cryogenic systems according to the second embodiment of the invention (FIGS. 3, 4) comprises the flexible double-wall corrugated pipeline 1 consisting of two corrugated pipes, the outer pipe 3 and the inner pipe 4, which are made of cold-resistant steel, arranged one inside the other, separated by the elastic inserts 5 and provided with the end adapter flanges 6 and 7. The end adapter flanges 6 and 7 are fixed to the end walls 8 and 9 of the locomotive adjacent sections. The adapter flanges 6 and 7, which are connected to the ends of the flexible double-wall corrugated pipeline 1, connect the cryogenic gas cavity 10 (FIG. 2) of the flexible double-wall corrugated pipeline 1 with the cryogenic gas passages 11 and 12 in the end walls 8 and 9 of the locomotive adjacent sections.

The intersection connection is provided with the elastic bar 13 arranged in the inner cavity of the inner corrugated pipe 4 of the flexible double-wall corrugated pipeline 1 and aligned relative to the inner corrugated pipe 4 of the pipeline 1 with the use of centering elastic inserts 19. The elastic bar 13 and the flexible double-wall corrugated pipeline 1 are made in the form of spatial helices. The ends of the elastic bar 13 are fixed in the adapter flanges 6 and 7.

The annular passage 17 between the inner corrugated pipe 4 and the outer corrugated pipe 3 is vacuumized or filled with a heat-insulating material or an inert gas. The elastic inserts 5 are made of a low-conductivity material. The outer surface of the flexible double-wall corrugated pipeline 1 is provided with a heat-insulating layer 18.

The intersection connection of locomotive cryogenic systems works as follows.

During the locomotive operation a cryogenic fuel passes from one section of the locomotive through the passage 11 in the end wall 8 via the flexible double-wall corrugated pipeline 1 into the passage 12 in the end wall 9.

When a locomotive runs on rails (the first embodiment), the helical form of the elastic bar 13 ensures uniform distribution of strains, as caused by mutual movements of the locomotive end walls 8 and 9, along its length. Since regions of the elastic bar 13 and the flexible double-wall corrugated pipeline 1 are connected by the suspensions 14, sag of the flexible double-wall corrugated pipeline 1, which is caused by mutual spatial movements of the locomotive adjacent sections during running, is reduced.

As a result, the use of the proposed structure improves reliability and increases the service life of the locomotive intersection cryogenic pipeline.

When a locomotive runs on rails (the second embodiment), the helical form of the elastic bar 13 ensures uniform distribution of strains, as caused by mutual movements of the locomotive sections, along its length. Strains appearing in the elastic bar 13, which are uniformly distributed along its length and reduced in magnitude, are transferred, via the elastic inserts 19, to the inner corrugated pipe 4 and further, via the inserts 5, to the outer pipe 3 of the flexible double-wall corrugated pipeline 1. Strains in regions of the flexible double-wall corrugated pipeline 1, as caused by mutual spatial movements of the locomotive adjacent sections during running, are reduced.

As a result, reliability of the intersection connection of locomotive cryogenic systems is improved and its service life is increased.

We claim:

1. An intersection connection of locomotive cryogenic systems, comprising:
   a flexible double-wall corrugated pipeline consisting of:
      two corrugated pipes consisting of cold-resistant steel, which are arranged one inside the other and separated by elastic inserts, and
      end adapter flanges fixed to end walls of the locomotive adjacent sections; and
   an elastic bar connected to the flexible double-wall corrugated pipeline by suspensions, the elastic bar and the flexible double-wall corrugated pipeline being comprised of spatial helices, and the ends of the elastic bar being fixed in the adapter flanges.

2. An intersection connection of locomotive cryogenic systems, comprising:
   flexible double-wall corrugated pipeline consisting of:
      two corrugated pipes consisting of cold-resistant steel, which are arranged one inside the other,
      elastic inserts separating the pipes, and
      end adapter flanges fixed to end walls of the locomotive adjacent sections, and
   an elastic bar arranged in the inner cavity of the inner corrugated pipe of the flexible double-wall corrugated pipeline and aligned relative to the inner corrugated pipe with centering elastic inserts, the flexible double-wall corrugated pipeline and the elastic bar being comprised of spatial helices, and the ends of the elastic bar being fixed in the adapter flanges.

* * * * *